United States Patent [19]
Quimby

[11] 3,868,837
[45] Mar. 4, 1975

[54] WHEELOCK FOR VEHICLE WHEELS

[76] Inventor: Charles A. Quimby, 403 S. Autry, Lafayette, Colo. 80026

[22] Filed: Oct. 3, 1973

[21] Appl. No.: 403,070

[52] U.S. Cl............................ 70/259, 70/18, 70/232
[51] Int. Cl. ...................... B60r 25/00, E05b 73/00
[58] Field of Search ......... 70/18, 19, 225, 226, 259, 70/260

[56] References Cited
UNITED STATES PATENTS

| | | | |
|---|---|---|---|
| 1,854,488 | 4/1932 | Root | 70/260 |
| 2,844,954 | 7/1958 | Marugg | 70/225 |
| 2,960,857 | 11/1960 | Winter | 70/19 |

Primary Examiner—Albert G. Craig, Jr.
Attorney, Agent, or Firm—Richard D. Law

[57] ABSTRACT

Two mating members form a C clamp about a vehicle tire and clinching against the wheel rim, and are fastened together by a bolt engaging internal threads in the members. An arm, lockable to the mating members extends radially of the wheel, covering at one end the bolt and at the other end having a cup member covering the wheel lugs and lug nuts.

5 Claims, 3 Drawing Figures

PATENTED MAR 4 1975 3,868,837

WHEELOCK FOR VEHICLE WHEELS

This invention relates to wheel lock which, in locked condition, restrains wheel rotation and removal of a wheel from a vehicle. The invention is particularly effectively utilized on small recreational vehicles such as camping trailers, boat trailers, and snowmobile trailers. These vehicles are often taken to remote recreational areas and left unattended for days. Thieves then have a relatively long time in which to make away with the vehicles, and theft has become a significant problem.

Accordingly, an important object of the present invention is to provide an apparatus for preventing the theft of vehicles.

A further object and advantage of the present invention is to provide apparatus which restricts rotational movement of a wheel and removal of the wheel from smaller vehicles.

Yet a further object and advantage of the present invention is to provide apparatus arranged to clamp around a peripheral portion of the tire of a wheel to restrict wheel rolling and to cover a portion of the means holding the wheel to the vehicle axle to restrict removal of the wheel from the vehicle axle.

Another object and advantage of the present invention is to provide apparatus which is essentially tamperproof.

These and other objects and advantages of the present invention may be readily ascertained by referring to the following description and appended illustration, in which.

Figures 1, 2, 3:
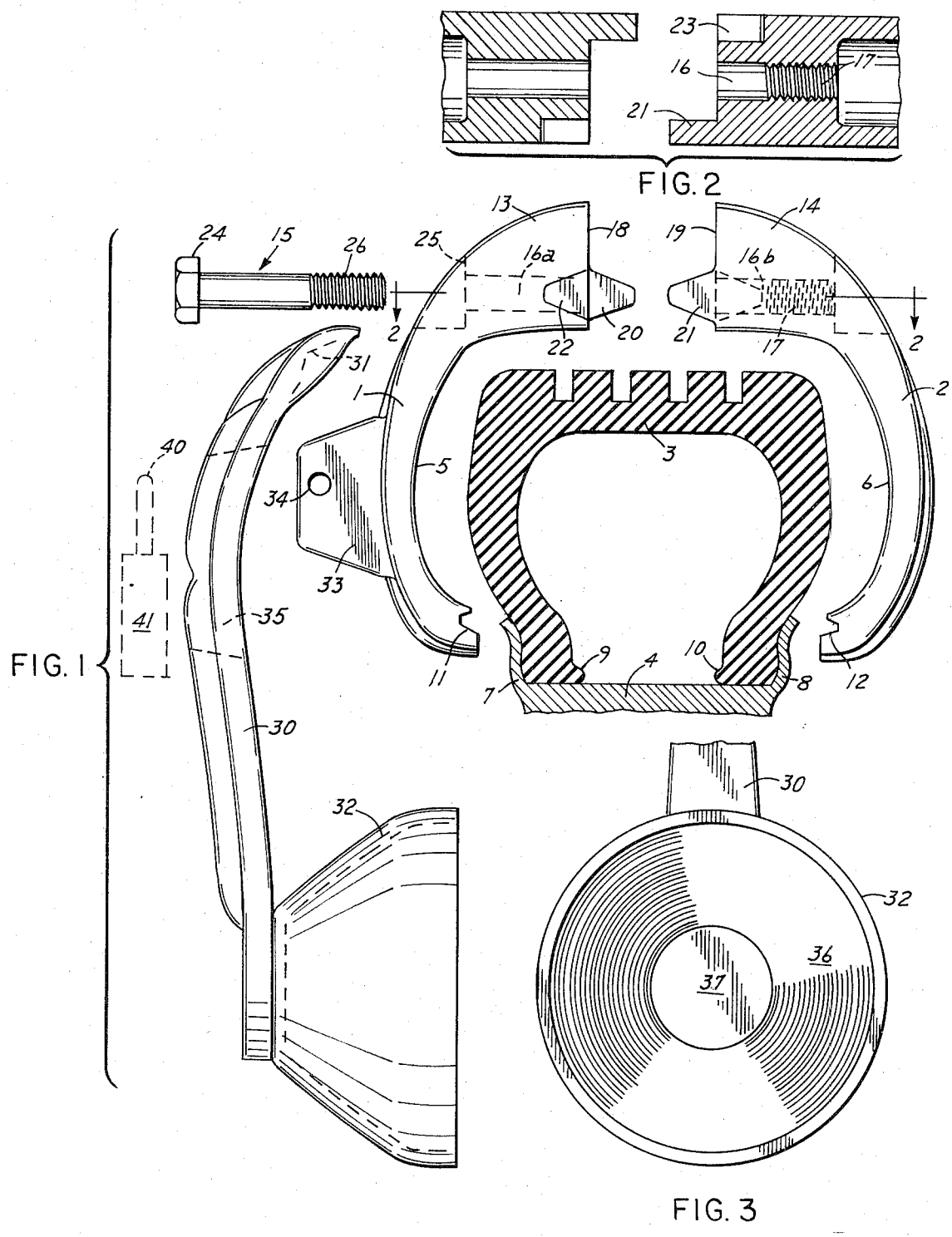
FIG. 1 is a side view, exploded and partially in section, of the apparatus of the invention.
FIG. 2 is a plan view of a detail of the invention.
FIG. 3 is another detail of the apparatus of the invention.

Considering FIGS. 1 through 3, mating members 1 and 2, in mated condition extend around a peripheral portion of tire 3 on wheel 4. The inner faces 5 and 6 of respective mating members 1 and 2 are arranged to form a C-shaped clamp around tire 3. The open ends of the resulting C-shaped clamp clinch down upon wheel rim 4. As most convention wheel rims have circumferential flanges 7 and 8 for retaining tire beads 9 and 10, mating members 1 and 2 may be provided with grooves 11 and 12 to clinch over rim flanges 7 and 8, respectively, and be clamped into position. Mating members 1 and 2 may be fabricated from numerous materials which are not easily shattered or cut, and cast aluminum is suggested. Outer end portions 13 and 14 of respective mating members 1 and 2 may be thickened to add strength to the assembly and to further restrain wheel 4 rolling when the mating members 1 and 2 are secured about the tire 3 on wheel 4.

In the illustrated embodiment, mating members 1 and 2 have mating flat faces 18 and 19 respectively which abut in mated condition. Protruding tabs 20 and 21 on mating members 1 and 2, respectively, align into receiving recesses 22 and 23 (FIG. 2), respectively. These prevent relative rotation of the two members. In aligned condition, mating members 1 and 2 are selectively secured together by bolt 15 inserted into passage 16a in mating member 1 and passage 16b in mating member 2 which are arranged to be aligned. Head 24 of bolt 15 abuts face 25 at the forward end of passage 16a, and threaded portion 26 on the shank of bolt 15 engages internal threads 17 in passage 16b. Alignment tabs 20 and 21, in addition to aiding in aligning mating members 1 and 2, prevent cutting of bolt 15 at the interface between mating members 1 and 2. The bolt may be pulled down tight, to secure the two members 1 and 2 together.

Arm 30 is selectively lockable to mating member 1 and includes a portion that radially extends toward the hub of wheel 4. At one end, a recess 31 in arm 30 covers the bolt head 24, and at the other end, cup member 32 is fixed to arm 30 to cover, for example, the lug nuts securing the hub of wheel 4 to the vehicle axle. Arm 30 and cup 32 are conveniently fabricated from the same rigid material as mating members 1 and 2; again, cast aluminum is suggested. Arm 30 may be lockably fastened to mating member 1 in any convenient way. In one embodiment, projection 33 with aperture 34 therethrough extends outwardly from mating member 1 and is arranged to fit through slot 35 formed in arm 30. A conventional lock bow 40 as on lock 41 may be fitted through projection aperture 34 with the lock bow 40 preventing withdrawal of arm 30 from member 1. Lock 41 may be a key type padlock, combination lock, or other well known type of lock.

Cup or bell member 32 on arm 30 is, again, preferably of the same material as other portions of the apparatus and may be attached in conventional manner. Cup 32 has concave inner wall 36 tapering to end 37 and presents a generally circular radial cross-section. In practice, the inner diameter of cup 32 is about five inches at the mouth.

In use, mating members 1 and 2 are placed around a tire, snugged into position against the rim and secured together by bolt 15. If the wheel has a hubcap, the hubcap is removed and arm 30 placed over projection aperture 33 with cup 32 covering the wheel lugs and recess 31 covering the head of bolt 15. Lock bow 40 is then fitted through aperture 34 and lock 41 locked, thereby locking the entire apparatus. The apparatus of the invention may be made in various sizes to accommodate various wheel and tire sizes.

I claim:

1. Apparatus selectively lockable about a peripheral section of a vehicle wheel, restraining vehicle wheel rotation and restraining wheel removal from the vehicle axle comprising a. a pair of mating members encompassing, in mated condition, a peripheral portion of a wheel-mounted tire, said mating members contacting the rim of the wheel on which it is mounted so as to restrain wheel rotation, said mating members having a bolt-accepting passage and each having at least one generally flat mating face arranged perpendicular to said bolt-accepting passage, the mating face of each member having at least one protruding tab and one receiving recess arranged on opposite sides of said bolt-accepting passage, the corresponding tab and recess on said mating faces are arranged to inter-fit and align with each other when said members are in a mated condition with said mating faces in contact;

b. means selectively securing said mating members in mated condition, said securing means having a bolt means extending through said bolt-accepting passage and arranged whereby when said bolt means is tightened, said mating members will be securely clamped to the rim of said wheel; and c. arm means extending radially of said wheel and being selectively mountable and lockable at a point intermediate to its ends along one outerside of one of said mating members, said arm means being arranged whereby one end is disposed adjacent said mating member to cover at least a portion of said securing means and the opposite end having a cover means arranged to at least conceal a portion of a means securing the wheel to said vehicle axle to prevent removal of the wheel from said axle.

2. Apparatus according to claim 1 wherein
said passage includes internal threads in one of said mating members into which said securing bolt means is threaded to tighten said members together in position, and
said arm means in locked condition covers the head of said bolt.

3. An apparatus according to claim 1 wherein
said protruding tabs have a width which is greater than the diameter of said bolt-accepting passage whereby the bolt means is substantially protected from being severed when said mating members are arranged in mated condition.

4. Apparatus according to claim 1 wherein said mating members include grooves for clinching on the flanges on a wheel rim having circumferential flanges.

5. Apparatus according to claim 1 wherein one of said mating members includes a fastening projection having an aperture therethrough and said arm means includes a slotted portion mating over said projection whereby said extending means is held in locked position by a lock bow passed through said aperture.

* * * * *